March 14, 1950     B. M. HOBLICK     2,500,412
VENTILATED FRUIT CUSHION
Filed March 27, 1948
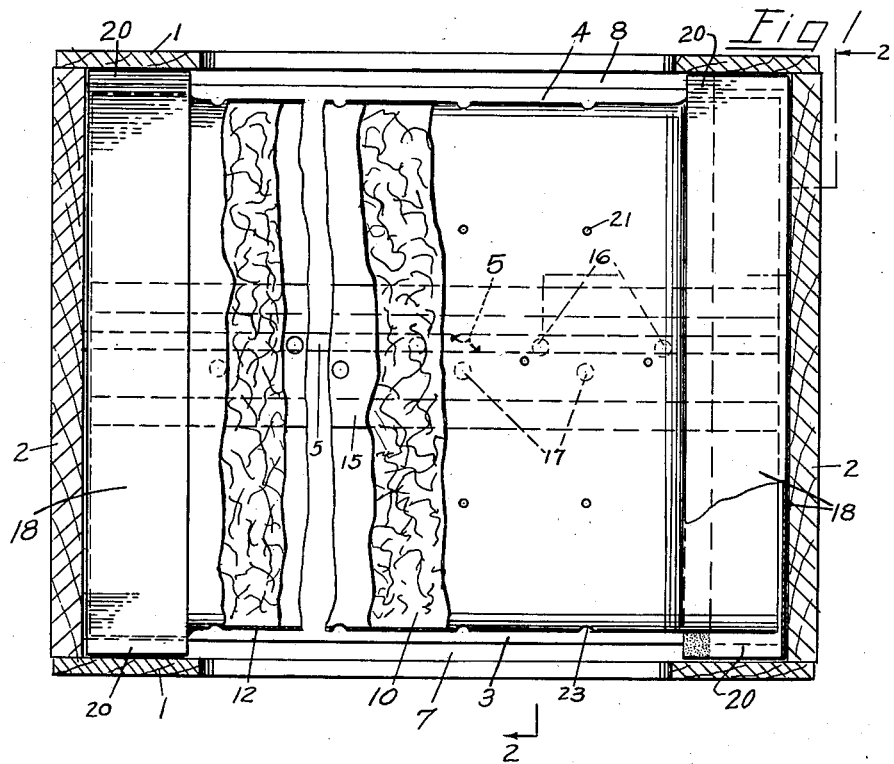
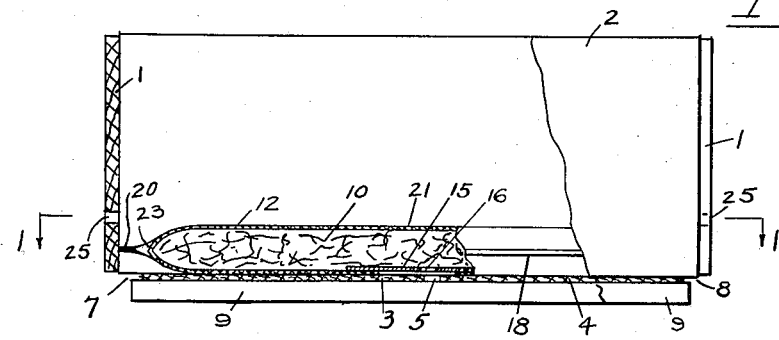
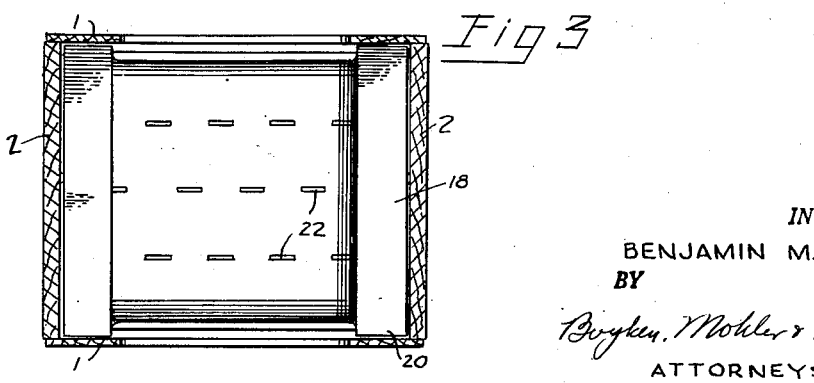
INVENTOR.
BENJAMIN M. HOBLICK
BY
Boyken, Mohler & Beckley
ATTORNEYS.

Patented Mar. 14, 1950

2,500,412

UNITED STATES PATENT OFFICE 2,500,412

VENTILATED FRUIT CUSHION

Benjamin M. Hoblick, Fresno, Calif., assignor to Blake, Moffitt & Towne, San Francisco, Calif., a corporation of California Application March 27, 1948, Serial No. 17,447

4 Claims. (Cl. 217—3)

This invention relates to a fruit cushion for use in supporting fruit in boxes during precooling thereof and during shipment and display thereof.

One of the objects of the invention is the provision of an improved cushion for fruit that is economical to make and easy to position in a fruit box and that is formed to facilitate precooling of the fruit and ventilation in a fully packed box.

Another object of the invention is the provision of a ventilated fruit cushion having positioning means thereon to insure proper registration of the ventilating openings in the cushion with the conventional ventilating openings in a standard fruit box when the cushion is in either one of two positions at 180° to each other about the central vertical axis of the cushion when the latter is horizontal and on the bottom of such box.

Lug boxes in which fresh fruit is packed for shipment are usually of standard construction in which there are two opposed side walls connected at their ends by two opposed end walls. The opposed side walls are spaced slightly from two of the opposite edges of the bottom wall adjacent the lower edges of said side walls to provide a ventilating crack along said two opposite edges.

The bottom wall is usually formed by two boards, one of which is wider than the other and these boards are spaced apart with their opposite outer edges about equal distances from the lower edges of the sides of the box with the result that the ventilating opening between the boards is generally offset to one side of a center line midway between said side walls and parallel therewith.

The cushion of this invention is so constructed that the air entering or passing through the cracks or openings between the side walls and the bottom wall and between the boards of said bottom wall is free to circulate through the cushion and to the fruit on the latter. It is immaterial which end of the cushion is adjacent either of the end walls of the box. The air will circulate the same even though the crack between the boards forming the bottom wall is not in the center of the bottom.

By the above structure, the field heat in the fruit that is packed in the box is readily removed by cool air circulating through the cushion and through the fruit above the latter.

Furthermore, with the present cushion, the fruit is not injured by any of the material of the cushion such, for instance, as the excelsior that may fill the cushion for the reason that the ventilating openings in the top side of the cushion are not sufficiently large to permit the fruit to engage said material, even where the fruit is fresh grapes.

In the drawings, Fig. 1 is an enlarged horizontal cross-sectional view taken through the box along line 1—1 of Fig. 2. Parts of the cushion are broken away to reveal the structure of the cushion.

Fig. 2 is a view taken generally along the line 2—2 of Fig. 1.

Fig. 3 is a reduced size sectional view through a box above the cushion showing a cushion in plan view on the bottom, and which cushion is the same as the one of Fig. 1 except for the shape of the ventilating openings.

In detail, a standard lug box, as shown in the drawings, comprises a pair of opposed side walls 1, that are connected at their ends by a pair of opposed end walls 2.

The bottom wall comprises a pair of boards 3, 4 that extend longitudinally of the side walls. The board 3 is slightly wider than the board 4, and said boards are spaced apart providing a ventilating crack between them. The opposite outer edges of the boards 3, 4 are preferably substantially equally spaced from the lower edges of side walls 1, thus providing a ventilating crack 7 between one wall 1 and board 3 and a ventilating crack 8 between the other side wall 1 and bottom wall 4. These cracks 7, 8 are along the lower corners of the box at the lower edges of the side walls 1.

In view of the difference in the width of boards 3, 4, it will be seen that the crack 5 is offset to one side of a central line between end walls 1 and parallel with cracks 7, 8.

Cleats 9 may be provided below the ends of the bottom boards 3, 4 for supporting the box spaced above a floor or above another box.

The fruit cushion comprises a rectangular pad 10 of shredded, relatively loosely packed material, such as excelsior, for example.

An envelope encloses said pad, said envelope comprising a sheet 12 of paper that extends centrally thereof across the top side of the excelsior, thus providing a top side for the cushion. The sheet then is extended downwardly across two opposite lateral side edges of the pad that are adjacent cracks 7, 8 and the opposite end portions of the sheet beyond said side edges extend inwardly toward each other over the marginal portions of said pad and below it. The opposite end edges of said sheet below said pad are spaced apart and a tape or strip 15 connects said edges, which strip is formed with a pair of rows of openings, the openings in one row being designated 16 and those of the other row being designated 17.

The ends of the pad are closed by strips 18 that overlap the top and bottom sides of the sheet 12 at the ends of pad 10, and these strips 18 project equal distances from the opposite lateral side edges of the cushion along the cracks 7, 8. These projecting ends are numbered 20 and their terminating ends are relatively close to the inner sides of the side walls 1. Thus said projections form spacers that center the cushion between side walls 1 and that also space the two side edges nearest said side walls from the latter.

The sheet 12 is formed with perforations 21 in the upper side thereof, which perforations may be circular, as shown in Fig. 1, or they may be elongated as indicated at 22 in Fig. 3. Irrespective of the precise shape of these openings, their dimensions are such that fresh fruit, such as grapes, will not project through them a sufficient distance to engage the excelsior and to thereby become bruised or injured.

Openings 23 are formed in the portions of sheet 12 that extend over the two lateral edges of the excelsior pad. These openings will receive air through cracks 7, 8 for passage into the cushion.

The openings 16 in bottom strip 15 are in registration with crack 5, hence air is free to flow into the cushion from below and almost centrally between the two side walls. The openings 16 are closed by the bottom board 3, but upon rotating the cushion 180° about its vertical axis, the openings 17 will register with crack 5. Hence in positioning the cushion in the box the operator need not be particular about the ends. The openings 16 or 17 will be certain to register with crack 5 no matter which end of the cushion is at the right or left hand end of the box. The projections 20 also insure proper registration of the openings 16 or 17 with crack 5 and they also function to space the openings 23 from the side walls so that said walls will not close said openings.

The openings 23 and 16, 17 may be substantially larger in size than openings 21 inasmuch as the fruit is not in a position to project through said openings. The said openings 21 are distributed over the top side of the cushion, thus providing for uniform ventilation of the fruit on the pad.

In some lug boxes a horizontal slot 25 is formed in each of the opposite sides at a level that is slightly above the upper side of the cushion. Ventilation is also had through this slot.

It is to be understood that the invention is not necessarily limited to the precise details of construction as shown and as described. The description and drawings are merely illustrative of a preferred form.

I claim:

1. A cushion for supporting fruit and the like in a rectangular fruit box having a bottom comprising a rectangular horizontal pad of relatively loosely packed shredded material, an envelope enclosing said pad formed with openings in the upper side thereof and along two of its lateral sides that are along two of the opposite edges of said pad, oppositely positioned transverse projections on said envelope at its opposite ends only adapted to engage two opposite sides of said box for spacing said two lateral sides from said two opposite sides of said box when said cushion is supported on said bottom.

2. A cushion for supporting fruit and the like in a rectangular fruit box having a bottom provided with a crack extending between two ends of said box and slightly to one side of a center line extending between said end walls comprising, a horizontal rectangular pad of relatively loosely packed shredded material, a rectangular envelope enclosing said pad formed with a pair of rows of spaced openings equally spaced at opposite sides of a central line extending between two sides of said pad that are adapted to be positioned adjacent said two ends of said box, the openings of one of said rows being positioned to register with the said crack when said envelope is in one of two positions at 180° to each other about the vertical axis of said envelope, and ventilating openings formed in the upper side of said envelope.

3. In combination with a lug box having a pair of opposed side walls and a pair of opposed end walls and a bottom wall in which said bottom wall is spaced along two of its edges from said side walls and is provided with a crack extending between said end walls at one side of a center line parallel with and between said two side walls, a cushion on said bottom wall having an envelope formed with a pair of parallel spaced rows of openings respectively positioned at equal distances from said center line and parallel therewith, and the openings of one of said rows being in registration with said crack, openings formed in said envelope along the space between the opposite edges of said bottom wall and said side walls, openings formed in the upper side of said cushion, and oppositely positioned projections on the opposite ends only of said side walls carried by said cushion from and centrally spacing said cushion between said side walls.

4. A cushion for supporting fruit and the like in a rectangular fruit box having a bottom formed with a crack offset to one side of the center thereof, comprising a rectangular pad of relatively loosely packed shredded material, a paper envelope enclosing said pad, said envelope being formed from a pair of parallel strips of paper secured together along their longitudinally extending marginal portions with said marginal portions in overlapping relationship at one side of said pad and end strips of paper at opposite ends of said pad forming the ends of said envelope, said end strips overlying the end marginal portions of said parallel strips at opposite sides of said pad, said parallel strips being formed with ventilating perforations, the perforations in one side of said envelope including two sets, one of which will register with said crack when said pad is in one of two positions on said bottom disposed at 180° to each other about the central vertical axis of said pad.

BENJAMIN M. HOBLICK.

REFERENCES CITED

The following references are of record in the file of this patent:

UNITED STATES PATENTS

| Number | Name | Date |
|---|---|---|
| 1,684,556 | Rosenberg | Sept. 18, 1928 |
| 1,902,361 | Hamersley | Mar. 21, 1933 |
| 2,064,122 | Krannert | Dec. 15, 1936 |
| 2,135,955 | Woodall | Nov. 8, 1938 |

FOREIGN PATENTS

| Number | Country | Date |
|---|---|---|
| 413,779 | Great Britain | July 26, 1934 |